June 21, 1932.  E. A. OWEN  1,864,463

AUTOMATIC VALVE COUPLING

Filed April 10, 1931

Edward A. Owen
INVENTOR

BY Victor J. Evans
and Co.
ATTORNEYS

Patented June 21, 1932

1,864,463

UNITED STATES PATENT OFFICE

EDWARD A. OWEN, OF CARTA VALLEY, TEXAS

AUTOMATIC VALVE COUPLING

Application filed April 10, 1931. Serial No. 529,197.

This invention relates to certain new and useful improvements in couplings of the automatic type.

One of the principal objects of the invention consists of rotatable means providing a swivel connection between the valve and sucker rods whereby the latter may not become distorted or broken during the coupling and uncoupling movements.

In the drawing:—

Figure 1:
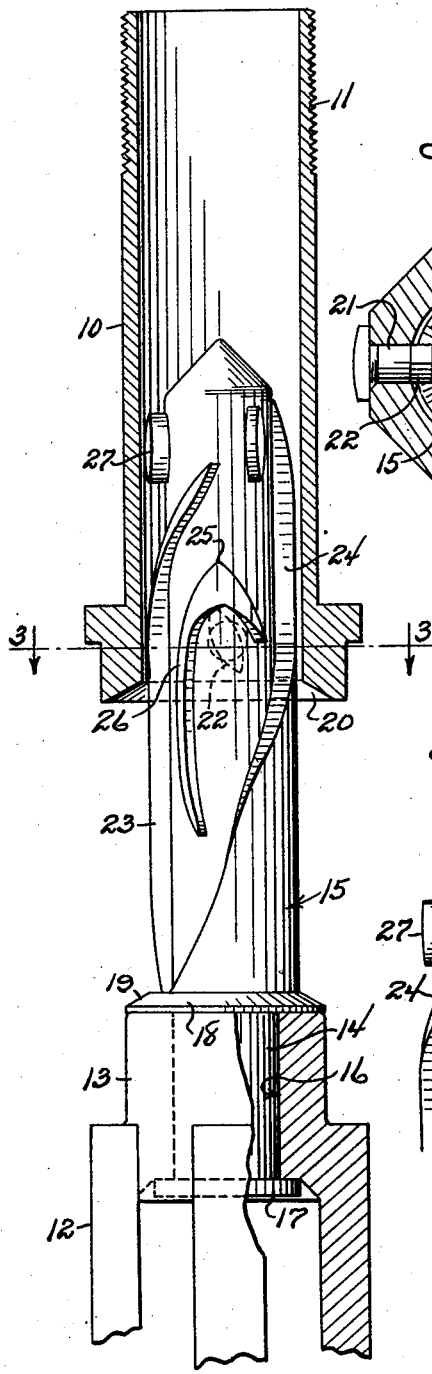
Figure 1 is a fragmentary sectional view taken through the invention and illustrative of the relative arrangement of the parts thereof during removal of the valve.

Referring to the drawing in detail wherein like characters of reference denote corresponding parts, the reference character 10 indicates generally the tubular housing of a pump or other valve threaded as at 11 at one end for connection with a coupling or the like, not shown, for association with a chain or series of sucker or pump rods. The valve cage 12, also of conventional form, is provided with an attaching sleeve 13 having an extension 14 of a swivel member 15 extended through the bore 16 thereof. An enlargement 17, formed upon that end of the extension 14 within the valve cage 12, provides a stop to prevent withdrawing or undue rectilinear motion of the swivel element 15 with relation to the cage.

A shoulder portion 18, carried upon that portion of the extension 14 beyond the sleeve 13, is provided with a tapered face 19 designed for accommodation within a pocket 20 in the lowermost end of the tubular housing 10.

Studs 21, transversely positioned upon diametrically opposite sides of the tubular housing 10, carry elliptically shaped locking elements 22 upon the ends thereof and which as shown in dotted lines in Figure 1 of the drawing are disposed at a bias or at an inclination with respect to the longitudinal or median center of the tubular housing 10, for purposes to be better understood in the following description of the invention.

Figure 3:
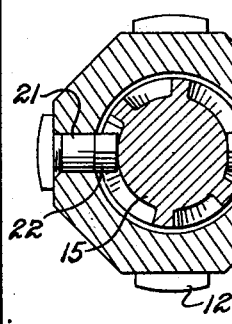
Figure 3 is a horizontal sectional view taken on line 3—3 of Figure 1.
Figure 2:
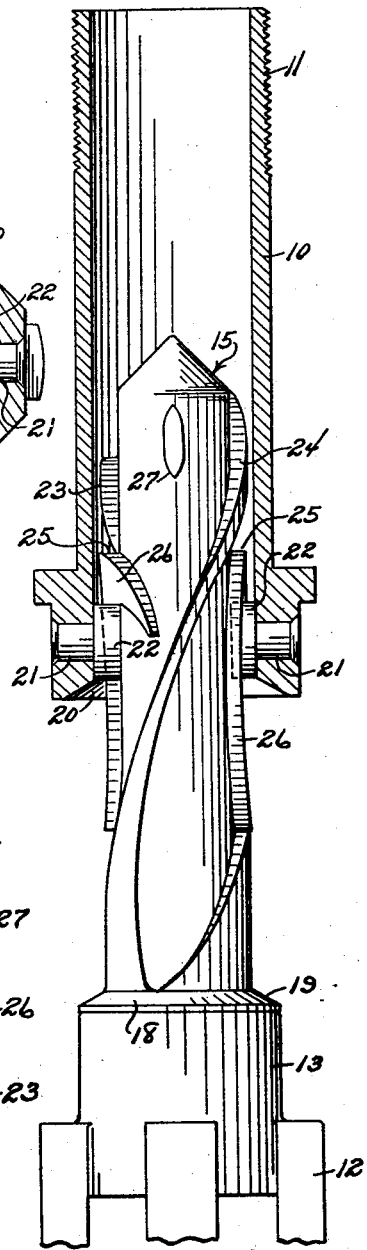
Figure 2 is a view similar to Figure 1 taken at right angles thereto.

The swivel member projects for appreciable distances beyond the shoulder portion 18 for accommodation within the bore of the tubular housing 10 in the manner suggested in Figures 1, 2 and 3.

Figure 4:
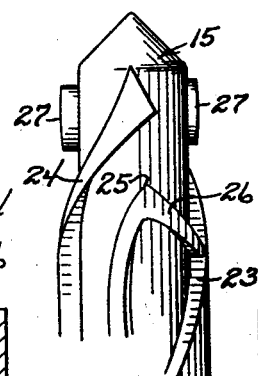
Figure 4 is a fragmentary elevation of the swivel member per se.

Long and short rib members 23 and 24 respectively, spirally arranged upon the outer surface of the swivel member, are designed to define passageways therebetween for the accommodation of the locking elements 22. As best shown in Figure 4 of the drawing, the outermost end of the rib member 24 is of diamond shape in order that the immediate of the locking elements 22 will be deflected to one side or the other for disposition within the recesses or passageways defined between the spirally arranged rib members. The passageways are obstructed or otherwise interrupted by the outermost V-shaped ends 25 of locking members 26 arranged upon the outer surface of the swivel member 15 in any suitable or preferred manner. The V-shaped heads or extremities of the locking members 26 are disposed at points upon the swivel member spaced from the ends thereof in order that a tubuar housing may be shifted for appreciable distances therebeyond toward the shoulder portion 18 to permit the locking elements 22 to be retracted through the passageways or recesses between the rib members free of contacting engagement with V-shaped extremities 25 of the locking members 26.

Guide members or deflectors 27 of elliptical formation are arranged upon the swivel members rectilinearly thereof and centrally of the passageways or recesses whereby the locking elements 22 will be guided or otherwise deflected within the passageways. As will be noted from the illustrations of the invention in Figures 1 and 2 of the drawing, the locking elements 22 will be engaged by the locking members 26 upon the occasion of the tubular housing 10 being partially retracted after having been partially telescopically associated with the swivel member. In the event the tubular housing was lowered to such an extent as to facilitate engagement of the shoulder 18 within the pocket 20, the locking elements 22 would be caused to be retracted outwardly through the passageways or recesses to one side of the locking members free of contacting engagement with the locking members.

From the foregoing description and accompanying drawing, it is to be noted that the coupling and uncoupling of the swivel member and tubular housing is determined by the particular depth projection of the tubular member per se. Due to the fact that the swivel member is the part of the device which turns, twisting strain is relieved to both the tubular member and sucker or well rods. The foregoing arrangement will obviate the usual hazard of couplings becoming unscrewed and the like, for the reason that all twisting strain is relieved from the usual chain of independent connections established between walking beams, well tools and the like.

This device may be used for pulling the lower valve from an oil well without removing the tubing from the well.

Having described the invention, what is claimed is:

A coupling comprising a tubular housing having at its lower ends inwardly disposed studs, a swiveled member having a body portion adapted to pass between the studs, said swivel member provided upon its exterior surface with spiral ribs spaced from each other and V-shaped portions located between said ribs and with which the studs are adapted to engage.

In testimony whereof I affix my signature.

EDWARD A. OWEN.